United States Patent [19]

Sansone et al.

[11] Patent Number: 5,326,661
[45] Date of Patent: Jul. 5, 1994

[54] PHOTOREFRACTIVE POLYMERS CONTAINING DISCRETE PHOTOCONDUCTIVE AND ELECTROOPTICAL UNITS

[75] Inventors: Michael Sansone, Union; Harris A. Goldberg, Middlesex; James L. McGinnis, Hunterdon, all of N.J.; Karsten Blatter, Frankfurt, Fed. Rep. of Germany; Ching F. Shu, Union; Anthony East, Morris, both of N.J.

[73] Assignee: Hoechst Celanese Corp., Somerville, N.J.

[21] Appl. No.: 792,546

[22] Filed: Nov. 13, 1991

[51] Int. Cl.$^5$ .................. G03G 5/07; C08F 226/06
[52] U.S. Cl. ................................ 430/20; 365/106; 430/80
[58] Field of Search .............. 430/20, 80; 365/106

[56] References Cited

U.S. PATENT DOCUMENTS

| | | | |
|---|---|---|---|
| 3,877,936 | 4/1975 | Limburg et al. | 430/80 |
| 4,999,809 | 3/1991 | Schildraut et al. | 430/20 |
| 5,080,989 | 1/1992 | Gruenbaum et al. | 430/56 |

Primary Examiner—John Goodrow
Attorney, Agent, or Firm—P. S. Kalyanaraman

[57] ABSTRACT

This invention provides novel polymers which contain discrete photoconductive and electrooptic moieties. The moieties may exist as part of the main chain of the polymer or as pendant side chains. The polymers have utility as transparent photorefractive media in photorefractive devices.

An invention polymer where both the photoconductive and electrooptic moieties exist as pendant side chains is illustrated by the copolymer of the following structure:

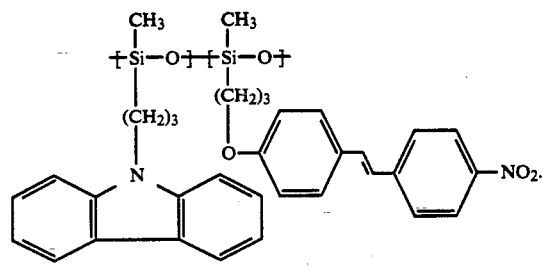

25 Claims, No Drawings

PHOTOREFRACTIVE POLYMERS CONTAINING DISCRETE PHOTOCONDUCTIVE AND ELECTROOPTICAL UNITS

This invention discloses organic polymers which contain electrooptic and photoconductive moieties as discrete covalently linked portions of a multifunctional polymer. The combination of photoconductivity and electrooptic activity in the polymers gives rise to their utility as photorefractive polymers.

BACKGROUND OF THE INVENTION

The photorefractive effect is the process by which light alters the refractive index of a material. Photorefractive effect and photorefractive materials are discussed by D. Pepper et al in *Scientific American*, page 62 (October 1990), and by P. Gunter and J.-P. Huignard, *Photorefractive Materials and their Applications*, Volumes 1 and 2, Springer-Verlag, 1988. Photorefractive materials have wide ranging applications including hologram cameras, optical image processing, spatial light modulators, optical interconnects, phase conjugate mirrors, and high density data storage.

The photorefractive effect is related to electrooptic phenomena. An introduction to electrooptics and other nonlinear optical phenomena, as well as to nonlinear optical materials is provided by *Nonlinear Optical Properties of Organic Molecules and Crystals*, Volumes 1 & 2, edited by D. S. Chemla and J. Zyss, Academic Press, 1987. The relationship between photorefractive effect and nonlinear optics is described in the *Scientific American* publication referred to above, and by J. Feinberg in *Physics Today*, page 46 (October 1988). Briefly, in a photorefractive material, light, usually from a laser source, causes a migration of electrons from one region to another, creating an inhomogeneous charge distribution, and hence an electrical field. This alters, or modulates, the refractive index of the material by way of the electrooptic effect. Thus, a photorefractive material exhibits electrooptic effect, as well as electronic charge transport phenomena generally termed photoconductivity.

Traditionally, photorefractive materials have been inorganic crystals such as, for example, lithium niobate, barium titanate, strontium barium niobate, CdS, GaAs, and the like. However, these materials are associated with problems such as high costs, limited efficiency in growing suitable crystals, and restricted shapes and sizes without much possibility for further processability of the crystals. Recently there has been a growing interest in the preparation of organic photorefractive materials. Organic materials generally may not have the above-mentioned problems. Furthermore, some electrooptic figures of merit for organics, such as, for example, $n^3 r/\epsilon$, are higher for organics than for inorganics. Additionally, the potential for controlling the spatial sensitivity in organic materials is much higher than in inorganics. This is so because a wide range of organic sensitizers for photocharge generation are available in the visible and near infrared regions, and therefore the wavelength at which photoconduction occurs can be chosen as desired.

K. Sutter et al, *Journal of Optical Society of America, B*, Volume 7, page 2274 (December 1990) describe the photorefractive properties of the single crystals of an organic material, 2-cyclooctylamino-5-nitropyridine doped with 7,7,8,8,-tetracyanoquinodimethane (TCNQ). S. Ducharme et al, *Physical Review Letters*, Volume 66, 1846 (1991) describe the observation of photorefractive effect in an electrooptic polymer, bisphenol A-diglycidyl ether/4-nitro-1,2-phenylenediamine, when doped with an organic photoconductor, diethylaminobenzaldehyde diphenylhydrazone. J. S. Schildkraut, *Applied Physics Letters*, Volume 58, page 340 (1991) discloses a three component organic photorefractive material, one of which is an electrooptic polymer containing a nonlinear optical chromophore, 4'-dialkylamino-4-methylsulfonyl stilbene (Formula 1). This is mixed with the sensitizer, N,N'-bis(2,5-di-tert-butylphenyl)-3,4,9,10-perylenedicarboxamide (Formula 2), and the photoconductor, 1,1-bis(4-di-p-tolylaminophenyl)cyclohexane (Formula 3).

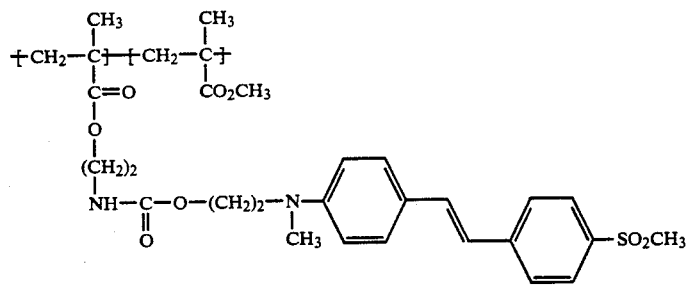

1

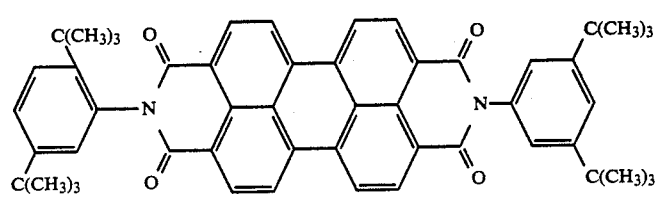

2

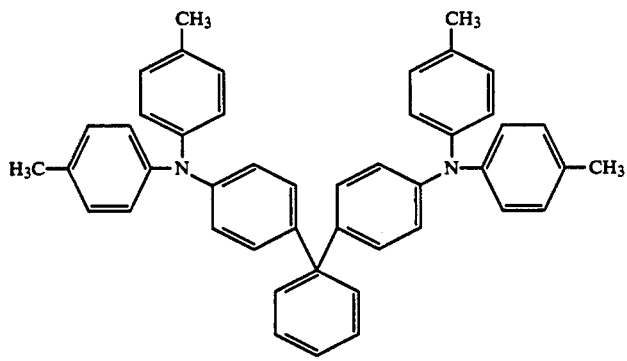

While the above organic systems exhibit the photorefractive effect, they are mixtures or guest-host materials, and as such are amenable to problems associated with guest-host systems. For example, guest-host systems generally suffer from loading problems. In other words, the amount of component materials that can be mixed together and be retained as a homogeneous system without phase separation may be limited. In addition, while the different components may be good performers individually, compatibility among them may not exist or may be difficult to achieve. Furthermore, electrooptic effect in a material depends on the efficiency of dipole orientation, and the presence and amount of the other components, particularly large amounts of the photoconducting material, may adversely influence the dipole orientation of the electrooptic material. Some electrooptic materials are poled in an electrical field, and the photoconductor may influence the efficiency and results of the poling. Thus, there is an interest in the development of novel organic photorefractive polymeric materials that are not made up of physical mixtures and guest-host systems.

U.S. Pat. No. 4,999,809 discloses a photorefractive layer comprising a homogeneous organic photoconductor containing electrooptical moieties. The electrooptical moieties are covalently bound to a polymer backbone. The photorefractive layer disclosed by Example 1 in the same patent comprises the polymer of Formula 4, a sensitizer, and a charge transporting agent.

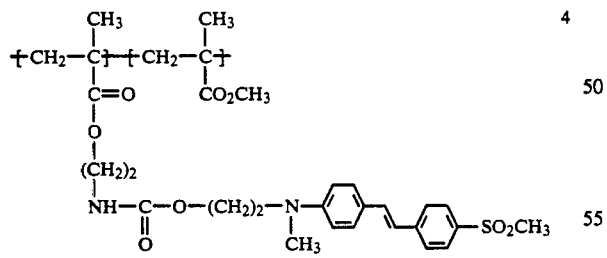

However, there is a growing interest to have the photoconductive and electrooptic parts, covalently linked as discrete units to the same polymer backbone. This may not only result in a homogeneous system but may also avoid the need to add an external transporting agent. It is well known in the art to have polymers with different functionalities as discrete units on the same polymer chain. However, due to issues such as, for example, the compatibility considerations discussed above, it is not known to have discrete photoconductive and electrooptic components in the same polymer.

SUMMARY OF THE INVENTION

The present invention is directed to a photorefractive composition comprising a polymer which has discrete photoconductive and electrooptic moieties covalently linked to the same polymer chain. The photoconductive and nonlinear optical moieties may coexist as side chains from the same polymer main chain, as represented in Formula 5:

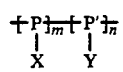

where P and P' could be the same or different and represent monomer moieties, m and n are integers which total at least 10, with the m monomer comprising between about 10–90 mole percent of the total (m+n) monomer units, X comprises a photoconductive moiety, and Y comprises a nonlinear optical moiety. P and P' represent any monomer moieties such as, for example, vinyls, siloxanes, alkylene, and the like. Preferred monomer moieties are vinylic and siloxane. Examples of X include carbazoles, benzotriazoles, arylhydrazones, oxadiazoles, and the like. Examples of Y include moieties that contain nonlinear optical chromophore groups such as, for example, oxynitrostilbene (Formula 6), aminonitrostilbene (Formula 7), aminonitroazobenzene (Formula 8), and aminodicyanovinyl triene (Formula 9).

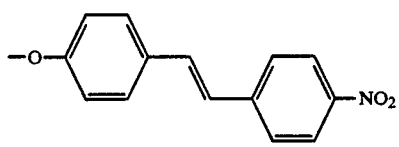

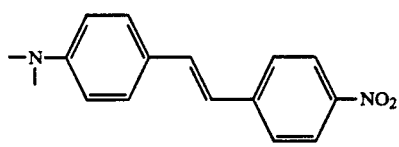

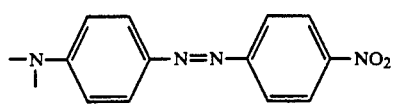

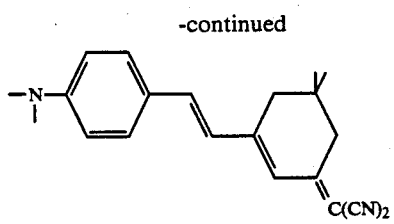

Alternately, either or both the photoconductive and the electrooptic moieties may form part of the polymer main chain. When both moieties form part of the main chain, the polymer may be represented as in Formula 10:

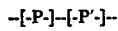   10 where P represents the photoconductive moiety, and P' the electrooptic moiety. An example where one moiety forms part of the main chain, and the other a side chain, may be the copolymer of Formula 11:

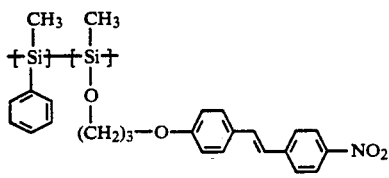

where p is an integer between 1 and 12. In Formula 11, the methyl phenyl silane group is the photoconductive moiety, and forms part of the main chain. The electrooptic moiety is depicted as a side chain in Formula 11.

The minor component in the photorefractive composition of the invention is the sensitizer, which may be added in required amounts to the polymer containing the photoconductive and the electrooptic moieties. The sensitizer may be a nonpolymeric compound such as, for example, a trinitrofluorenone, or it may be a polymeric sensitizer. The choice of the sensitizer depends upon the wavelength where photoconduction is desired. For example, trinitrofluorenones as sensitizer facilitate photoconduction at around 400–650 nm wavelengths, phthalocyanines at around 650–700 nm, and naphthalocyanines at around 750–800 nm.

The present invention also envisions photorefractive compositions containing polymers wherein the photoconductive, the electrooptic, and the sensitizer moieties are all covalently linked as part of the same polymer main chain, as represented in Formula 12:

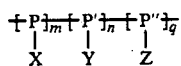   12 where P, P' and P'' could be the same or different and represent monomer moieties, m, n, and q are integers which total at least 10, with the q monomer comprising up to about 20 mole percent of the total (m+n+q) monomer units, the m monomer comprising up to 50 mole percent of (m+n) monomer units; X comprises a photoconductive moiety; Y comprises a nonlinear optical moiety; and Z comprises a photosensitizer moiety. Formula 12 depicts X, Y, and Z as side chains linked to the polymer main chain. However, it is to be understood that one or more of X, Y, and Z may form part of the polymer main chain also.

The present invention also relates to formation of solid film media from the polymeric compositions of the invention, as well to devices fabricated from the polymers of the invention. The polymers of the invention have good solubility in common organic solvents such as, for example, halogenated hydrocarbons, ketones, esters, and the like, and can be cast as films, using the methods known to those skilled in the art, to obtain films with excellent transparency. The term "transparent" as employed herein refers to an optical medium which is at least about one percent light transmitting with respect to the wavelengths of use.

DETAILED DESCRIPTION OF THE INVENTION

The present invention relates to photorefractive compositions containing polymers which carry photoconductive and electrooptic moieties either as discrete side chains on the polymers, as shown in Formula 5, or as part of the main chain of the polymers, as shown in Formula 10. The polymers may be of any type, including, for example, addition polymers, condensation polymers, thermoplastics, and thermosets. The various types of polymers, their chemistry and properties are described by F. W. Billmeyer, Jr., in *Textbook of Polymer Science*, 3rd edition, John Wiley & Sons, 1984. One mode of the present invention may be illustrated by the siloxane polymer of Formula 13, wherein both the photoconductive and electrooptic moieties exist as discrete side chains on the same polymer main chain:

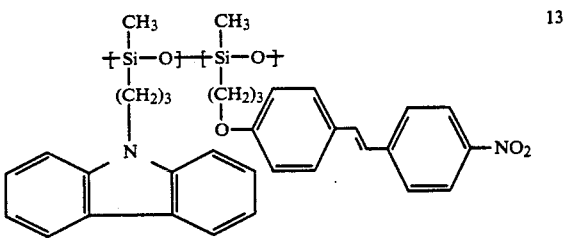

In Formula 13, the carbazole group serves as the photoconductor, while the oxynitrostilbene group is the electrooptic moiety. A typical process to synthesize the polymer of Formula 13 is illustrated in Scheme I:

Scheme I

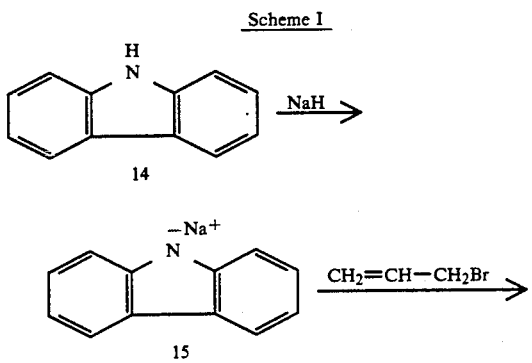

-continued
Scheme I

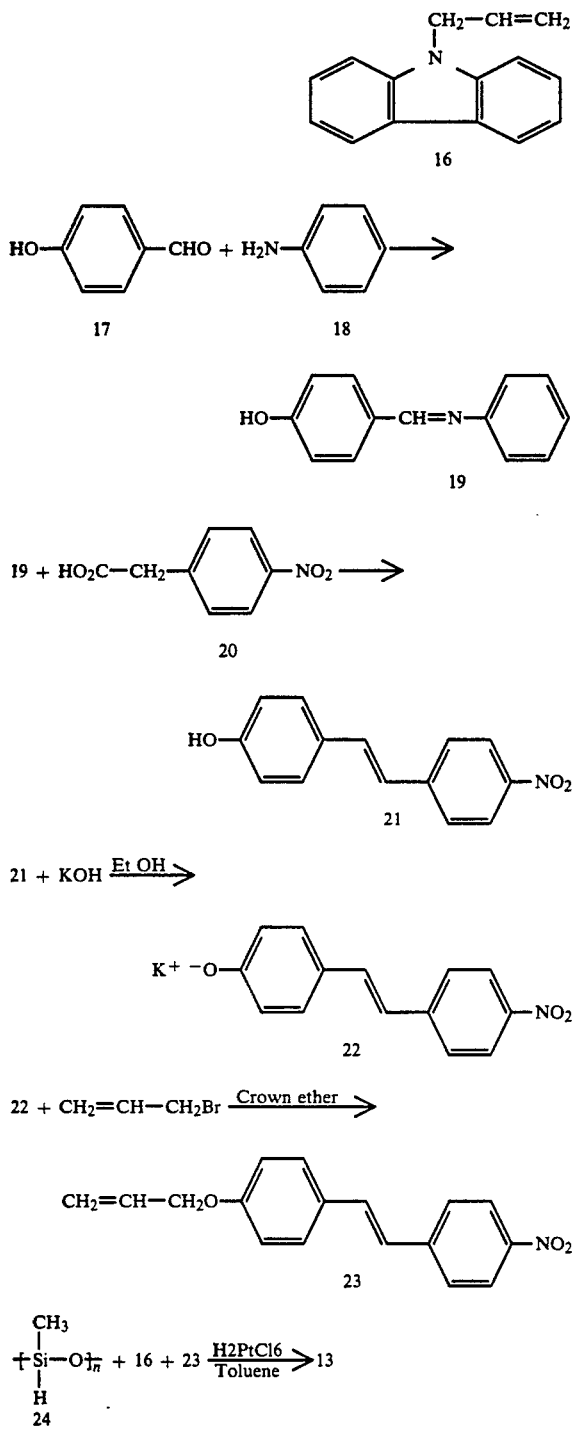

Thus, carbazole (Formula 14) was converted to its anion (Formula 15) by reacting with, for example, sodium hydride in a solvent such as, for example, tetrahydrofuran. The anion of Formula 15 was then converted to N-propenyl carbazole (Formula 16) by reacting with allyl bromide.

The required electrooptic oxynitrostilbene moiety was synthesized starting from 4-hydroxybenzaldehyde (Formula 17), and aniline (Formula 18), both available from Aldrich Chemicals, Milwaukee, Wis. Compounds of Formulas 17 and 18 were reacted in a solvent such as, for example, toluene to form the Schiff base (Formula 19), which was then reacted with 4-nitrophenylacetic acid (Formula 20, from Aldrich Chemicals) in a solvent such as, for example, glacial acetic acid, to form 4-hydroxy-4'-nitrostilbene (Formula 21). This was then converted to its potassium salt (Formula 22) by reacting with potassium hydroxide in aqueous ethanol. This potassium salt was then reacted with allyl bromide in the presence of a suitable catalyst such as, for example, a Crown ether catalyst, to yield the allyl ether derivative of Formula 23. Polymethylhydrosiloxane (Formula 24, available from Huls Petrarch Chemicals, Bristol, Pa.) was then reacted with the compound of Formula 16 and the compound of Formula 23 in the presence of a suitable catalyst such as, for example, chloroplatinic acid, to result in the polymer of Formula 13. By varying the ratio of the moieties of Formula 16 and Formula 23, polymers with different ratios of photoconductive and electrooptic moieties may be prepared. Thus, for example, when the ratio of the carbazole moiety (Formula 16) to the oxynitrostilbene moiety (Formula 23) was 9:1 in the reaction, a polymer of Formula 13 containing those two moieties in about 9:1 ratio was obtained.

The polymers may be isolated from the reaction and purified by methods familiar to those skilled in the art. In one embodiment, for example, a polymer of Formula 13 was filtered from the reaction, dissolved in a solvent such as, for example, tetrahydrofuran, reprecipitated by adding a non-solvent such as, for example, methanol, refiltered, and dried. The polymer may be analyzed by customary techniques such as, for example, NMR spectrometry, elemental analysis, gel permeation chromatography, high pressure liquid chromatography, thermal analysis, and the like.

A process to synthesize polymer of Formula 11 wherein p is 3, and where the electrooptic moiety exists as a side chain while the photoconductive moiety is part of the main chain of the polymer is illustrated in Scheme II:

Scheme II

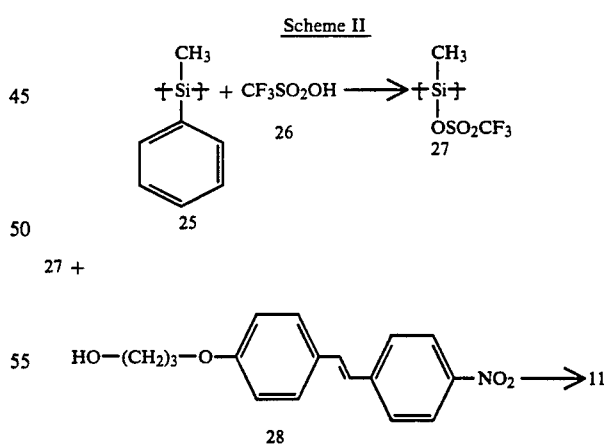

The polymer of Formula 11 was synthesized by grafting an alcohol containing electrooptic functionality (Formula 28) on to the photoconducting polymer, polymethylphenylsilane (Formula 25, available from Huls Petrarch Chemicals), by following a procedure analogous to that described by F. Yenca et al in Polymer Preprints, Volume 28, page 222 (1987). Thus, polymer of Formula 25 was reacted with trifluoromethane sulfonic acid (Formula 26) to form the silyl triflate derivative (Formula 27). This was then reacted with the alcohol of Formula 28 in the presence of base to form the polymer of Formula 11 where p is 3. Additionally, by employing more than one alcohol, one may be able to graft more than one functionality on the polymer chain. Thus, for example, employment of n-butanol in addition to the alcohol of Formula 23 in the above reaction, gives a polymer containing both the electrooptic and n-butoxy functionalities on the polymer. Furthermore, if more than one alcohol is employed in the above grafting reaction, one of such alcohols may be chosen to contain a photosensitizer moiety, and another one an electrooptic moiety. The resulting polymer may have the photoconductive, photosensitizer and electrooptic moieties linked covalently.

The alcohol of Formula 28 may be synthesized by reacting the potassium salt of 4-hydroxy-4'-nitrostilbene (Formula 22) with 3-iodopropan-1-ol (Formula 29) in the presence of a catalyst, such as, for example, 18-crown-6, in a solvent such as, for example, acetonitrile, as illustrated in Scheme III:

Scheme III

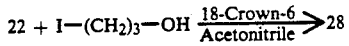

29

The polymers of the invention may be used to form films by any suitable technique known to those skilled in the art, such as spin coating, dip coating, brush coating, and the like. Generally spin coating is preferred due to its simplicity and speed. For a typical spin coating experiment, a solution of the polymer of Formula 13 is made in a suitable concentration using a suitable solvent such as, for example, cyclohexanone. The solution is typically filtered through microporous membranes made of polytetrafluoroethylene (Teflon$^R$, from E. I. dupont de Nemours & Co., Wilmington, Del.) to remove any insolubles. The filtered solution can be spin coated onto suitable substrates such as, for example, glass, silicon wafers, aluminum wafers, and the like. In one example, the solution was spin coated onto glass substrates that had previously been coated with a conducting material, such as indium-tin-oxide (ITO), at spin speeds ranging from 200-5,000 revolutions per minute (rpm), for periods ranging from about 20-200 seconds. Drying of the coatings leaves good films with good transparency.

Demonstration of photorefractivity in the polymer involves demonstration of electrooptics and photoconductivity. Electrooptics is generally demonstrated by measuring the electrooptic coefficient, r, in the electrically poled film. Poling of a film from polymer of Formula 13 under applied electric fields, and measurement of r under poled conditions, may be done following the procedure of C. C. Teng et al, Applied Physics Letters, Vol. 56, 1734 (1990). In a typical poling experiment, the polymer film is coated with a conducting material such as gold. This gold layer and the ITO coating serve as opposite electrodes in the experiment. The polymer sample is heated to a temperature within a range of about $T_g \pm 5°$ C. and an electric poling field is applied across the electrodes for a period of about 4-7 minutes. The sample is then slowly cooled back to near ambient temperature when power is turned off.

For measuring the electrooptic coefficient r, a collimated laser beam of wavelength 1.304 $\mu$m is allowed to enter the sample through the glass substrate, the ITO coating, polymer film, and reflect off the gold substrate. A field of about 50 volts is applied across the sample as a modulating field. The output beam goes to a detector, and is measured against the reference signal. The value of r is determined by varying the phase of the incident laser light and measuring the maximum and minimum DC intensities directly from the detector, and analyzing the data following the procedure of C. C. Teng et al, above. The measurements are performed after poling the film at several electric field strengths, ranging from 20 to 140 Volts per micrometers (V/$\mu$m)

Photoconductivity may be measured by methods known to those skilled in the art such as, for example, the photoinduced discharge (PID)method, and the time of flight method. An instrument such as, for example, Monroe Static Charge Analyzer Model 276A (from Monroe Electronics, Inc., Lyndonville, N.Y.) may be used for measuring photoconductivity by the PID method. In a typical experiment, a film of the polymer of Formula 13 is coated on an ITO-coated glass substrate as above, and then corona charged. Photocharge generation may be induced with a broadband light source such as, for example, tungsten filament lamp. The change of sample voltage with time, dV/dt, both with and without illumination, may be measured to give the dark decay and photodecay respectively. In one experiment, the initial photodecay rate for a polymer of Formula 13, when the carbazole to oxynitrostilbene ratio was 9:1, was found to be 31 V/second, and when the same ratio was 75:25, it was found to be 14 V/second, thus demonstrating the photoconductivity of the polymers of the present invention.

Demonstration of photoconductivity and eletrooptic activity in a material may generally be considered adequate demonstration of photorefractive capability in the material. However, if desired, photorefractivity may be independently demonstrated in the polymers of the invention by employing techniques familiar to those skilled in the art. Some common techniques are discussed in Photorefractive Materials and their Applications, P. Gunter and Huignard, ed., referred to above, Volume 1, pages 175-190, and in Laser-induced Dynamic Gratings, by H. J. Eichler, P. Gunter and D. W. Pohl, Springer-Verlag, New York, 1986, pages 25-33. For demonstrating the photorefractive behavior by the two wave mixing process, a film of the polymer of Formula 13 may be deposited on an ITO-coated glass, followed by depositing an electrode such as, for example, gold, on top of the polymer film. The polymer film is poled as described above at field strengths of, for example, about 50-100 V/$\mu$m. A Helium-Neon laser beam of about 35 mW is divided into two beams through a beamsplitter. Each beam is reflected off a mirror and combined inside the photorefractive material setting up a diffraction grating whose grating period depends on the wavelength and angle of incidence. Photorefraction is identified by the phase difference between the grating formed and the light intensity. By measuring the energy transfer between the two beams used to write a grating in the polymer, the efficiency of photorefraction may be characterized.

The following nonlimiting Examples are provided in order to further illustrate the present invention.

EXAMPLES

In the following Examples, g refers to grams, ml to milliliters, m to moles, mmole refers to millimoles, °C.

to degrees Celsius, V to volts, nm to nanometers, μm to micrometers, $R_f$ to retention factor, pm/V to picometers per volt, and 'ambient temperature' to temperatures ranging between 20°–28° C.

Example 1. Preparation of N-propenylcarbazole (Formula 16)

Sodium hydride (43 g, 1.05 m) was charged into a 5 liter flask fitted with mechanical stirrer, reflux condenser, argon atmosphere, and an addition funnel of suitable size. Hexane (3×250 ml) was added three times and the sodium hydride was washed out under argon atmosphere, each time draining the hexane out. A solution of carbazole (Formula 14, 167 g, 1.0 m) in tetrahydrofuran (2 liters) was taken in the addition funnel and was slowly added with stirring into the flask over 60 minutes. The solution was refluxed for 3 hours, and then cooled to ambient temperature. To this solution of the anion of Formula 15, a solution of allyl bromide (145 g, 1.2 m) in tetrahydrofuran (500 ml) was added from an addition funnel fairly rapidly. The mixture was heated to reflux for four hours, analyzing the progress of the reaction by thin layer chromatography (silica gel, with chloroform:ethyl acetate-4:1 as eluent; $R_f$ of product was about 0.95). The reaction mixture was filtered hot to remove the insolubles, and the filtrates were evaporated to remove the solvents. The residue was dissolved in about 400 ml of diethyl ether, transferred to a separatory funnel, and washed with water (4×200 ml). The organic layers were dried with anhydrous sodium sulfate, filtered and evaporated to yield compound of Formula 16 as a brown solid. This was purified by recrystallizing it from methanol, filtering and drying at ambient temperature. Yield: 138.6 g, m.p. 57°–58° C.

Example 2. Preparation of the Schiffs base of Formula 19

4-Hydroxybenzaldehyde (Formula 16, 2.05 m) and toluene (2 liters) were charged into a 5 liter 3 necked round bottom flask equipped with a mechanical stirrer, a heating mantle, a Dean-Stark adaptor, and a reflux condenser, and provided with argon atmosphere. The mixture was heated to reflux with stirring to dissolve the benzaldehyde. Aniline (93 g, 1. 025 m) was added fairly rapidly from an addition funnel into the solution, the heating was stopped and the reaction was cooled until a straw-colored precipitate formed. It was heated back to reflux again and aniline (93 g) was added once again in a similar manner. A total reflux time of 5 hours was maintained when water collected in the Dean-Stark adapter corresponding to almost the theoretical amount. The reaction mixture was cooled to ambient temperature, and the product of Formula 19 was filtered. The solid was washed with cold toluene, and dried at about 90° C. in a vacuum oven to constant weight. Yield: 381 g (97%). This product is pure enough for Example 3. If needed, it may be purified by recrystallization from absolute ethanol to give cream-colored crystals, m.p. 194°–196° C.,

Example 3. Preparation of 4-hydroxy-4'-nitrostilbene (Formula 21)

The Schiffs base of Formula 19 (807 g, 4.098 m), 4-nitrophenylacetic acid (Formula 20, 742 g, 4.098 m), and glacial acetic acid (3.5 liters) were charged into a 12 liter, 4 necked flask, fitted with a reflux condenser, a mechanical stirrer, and a long thermometer, and provided with an argon atmosphere. The mixture was heated to about 50° C., and stirred for about 7 days at that temperature, during when an orange solid formed in the reaction. After that period, the mixture was refluxed for about 2 hours, and the solution was concentrated to about 2500 ml by distilling off a quantity of the acetic acid. Cooling of the mixture gave an orange solid, which was then filtered, and dried. The product of Formula 21 was recrystallized from boiling acetonitrile to give bright yellow needles, which were filtered and dried in a vacuum oven at about 70° C. Yield: 693 g (70%), m.p. 208°–210° C.

Example 4. Preparation of the potassium salt (Formula 22)

A portion of the product from Example 3 (120 g, 0.5 m) and ethanol (2.5 liters) were charged into a 5 liter 3 necked flask equipped with a mechanical stirrer, a reflux condenser, a heating mantle, and an addition funnel, and provided with argon atmosphere. The compound of Formula 21 dissolved on heating with stirring to reflux temperature. A solution of potassium hydroxide (30 g, 0,54 m) in water (200 ml) was added dropwise from the addition funnel into the flask, and then the heat was turned off. Cooling of the reaction mixture under argon overnight with stirring gave purple crystals of product of Formula 22. The crystals were filtered, and washed with tetrahydrofuran until the washings were colorless, and then dried in a vacuum oven at about 60° C. Yield: 139.5 g.

Example 5. Preparation of 4-allyloxy-4'-nitrostilbene (Formula 23)

A portion of the product from Example 4 (100.91 g, 0.36 m), 18-Crown-6 catalyst (0.7 g), and acetonitrile (1900 ml) were charged into a 5 liter 4 necked flask equipped with a mechanical stirrer, a reflux condenser, a heating mantle, and an addition funnel, and provided with argon atmosphere. The mixture was refluxed gently while a solution of allyl bromide (48.4 g, 0.4 m) in acetonitrile (150 ml) was added dropwise over a period of about 2 hours. The mixture formed a bright yellow color. The mixture was filtered hot to remove the inorganics, and the flitrates were cooled to provide product of Formula 23 as a yellow solid. It was filtered and dried in a vacuum oven at ambient temperature. Yield: 83 g (82%).

Example 6. Preparation of polymer of Formula 13

Polymethylhydrosiloxane (Formula 24, $M_w$ about 4000–5000, 20.92 g), N-propenylcarbazole from Example 1 (54.1 g, 0.261 m), 4-allyloxy-4'-nitrostilbene from Example 5 (24.56 g, 0.087 m), and toluene (500 ml, freshly distilled from over sodium and benzophenone) were charged into a 1 liter 3 necked flask equipped with a reflux condenser, magnetically stirrer bar, and heating mantle, and provided with an argon atmosphere. The mixture was kept gently boiling and stirring while purging with argon for about 15 minutes. The catalyst solution was prepared separately by dissolving chloroplatinic acid (0.1333 g, 0.32 mmole) in isopropanol (20 ml). The toluene mixture was refluxed for another 15 minutes, and cooled down to approximately 100° C., when about half of the catalyst solution was slowly added via syringe into the reaction. The mixture turned yellowish in color. It was kept stirring and refluxing for about 5 hours, cooled to about 100° C., and the rest of the catalyst solution was added. The reaction mixture was then refluxed for about 12 hours. Two layers had formed in the reaction. The reaction was cooled to ambient temperature, and the top supernatant yellow liquid was decanted off and discarded. The bottom layer, a thick brownish colored paste, was transferred, with the aid of about 2 liters of tetrahydrofuran, into a blender. About 3.5 liters of methanol were added to the blender; high shear blending resulted in a yellow powder, which was filtered. The powder was redissolved in tetrahydrofuran (2 liters), and reprecipitated using methanol (3.5 liters) in a blender, and this process was repeated to finally yield the polymer of Formula 13 as a fine yellow powder. This polymer was filtered, and dried in vacuum at ambient temperature. It contained a 3:1 molar ratio of the carbazole and oxynitrostilbene moieties. Yield: about 50 g.

Example 7. Preparation of 4-(3-hydroxypropoxy)-4'-nitrostilbene (Formula 28)

The potassium salt of 4-hydroxy-4'-nitrostilbene from Example 4 (280 g, 1 m), acetonitrile (2 liters) and the catalyst 18-Crown-6 (1 g) were charged into a 4 liter 3 necked flask equipped with a reflux condenser, mechanical stirrer, a heating mantle, and an addition funnel, and provided with argon atmosphere. The mixture was kept gently refluxing and stirring, while 3-iodopropan-1-ol (223 g, 1.2 m) was added dropwise over a period of about 3 hours. The reaction mixture was refluxed for about 24 hours. About a liter of the solvent was then distilled off at atmospheric pressure, and the reaction mixture was allowed to cool to ambient temperature. The yellow solid was filtered, dried, and recrystallized from toluene to yield yellow crystals of compound of Formula 28. Yield 210 g (70%).

Example 8. Grafting of polymethylphenylsilane with the alcohol of Formula 28 and n-butanol Polymethylphenylsilane (1.962 g) and dry methylene chloride (25 ml) were charged into a 50 ml 2 necked flask equipped with a magnetically stirred bar, and a cooling bath, and provided with argon atmosphere, and the solution was stirred and cooled to 0° C. Triflurome-thanesulfonic acid (0.24 ml) was syringed into the flask. The yellow solution was allowed to warm up to ambient temperature over about 2 hours, when anhydrous pyridine (0.31 ml) was syringed in. The mixture assumed an orange color. 4-(3-hydroxypropoxy) -4'-nitrostilbene from Example 7 (0.483 g, 1.61 mmole) was rapidly added into the flask, and the mixture stirred for about 4 hours. n-Butanol (0.12 g, 1.6 mmole) was then syringed into the flask, and the mixture stirred at ambient temperature for about 18 hours. It was then filtered, and the yellow filtrates were diluted with dry methanol (about 150 ml) to precipitate the polymer as a yellow powder, which was filtered and dried in vacuum at ambient temperature. Analysis showed this product to be a polymethylphenylsilane grafted with the alcohol of Formula 28 and n-butanol. Yield: 1.4 g (60%).

Example 9. Preparation of Film from a polymer of Formula 13 on ITO-coated glass substrates A portion of the polymer of Formula 13 wherein the ratio of carbazole to the nitrostilbene moiety was 9:1 (3 g) was added to cyclopentanone (6.4 g) in a two ounce creme jar and stirred with a magnetically stirred bar at ambient temperature for two days to obtain a 32 weight % solution. This solution was filtered first through a Gelman brand polytetrafluoroethylene (Teflon$^R$) membrane (1.0 μm pore size) filter mounted on a glass syringe (10 cc capacity), followed by filtration through a Gelman brand polytetrafluoroethylene (Teflon$^R$) membrane (0.45 μm pore size) membrane filter under nitrogen atmosphere.

The filtered solution was spin coated at 1100 rpm for 20 seconds onto glass slides (¾ inch × 1.5 inches) that had previously been coated with Indium-Tin-Oxide. The slides were dried under a nitrogen atmosphere for 16 hours at 135° C., followed by cooling to ambient temperature. These slides were used for the poling experiments.

Example 10. Poling of film made in Example 9

A slide containing the polymer film from Example 9 was placed in an Edward's Vacuum Coating System (Model No.: E-306A, from Edward's Temescal, Division of BOC Group, Inc., Berkeley, Calif.). A gold layer of 150 nm thickness was deposited on the polymer film in a pattern of two squares, each square about 0.7 cm × 0.7 cm. A 36 gauge wire was then attached to the ITO glass substrate and a 38 gauge wire was attached to the gold electrode square using silver paint (Catalog No.: 14810, from Ernest Fullam, Inc., Latham, N.Y.). The sample was then placed in a Mettler Hot stage (Model No.: FP 80, from Mettler Instruments Corp., Hightstown, N.J.) and heated to a temperature of 60° C. A dc poling electrical field of 20 V/μm was applied across the electrodes for a period of 4 minutes. The sample was then allowed to cool at a rate of 1° C./minute to about 25° C. when the electric field was turned off. By following a similar procedure and changing the filed, the polymer film could be poled at different field strengths.

Example 11. Measurement of the electrooptic coefficient, r

For this measurement, a collimated laser diode of wavelength 1.304 μm (Model No.: S1102, supplied by Electrooptics Corp., 2985 Sterling Court, Boulder, Colo. 80301) was used. The sample from Example 10 poled at about 100 V/μm was held vertically and then rotated to an angle of 45° with respect to the incoming laser beam. The laser beam, polarized at 45°, passed through a Soleil Babinet compensator (Model No.: 8-400-IR, supplied by Special Optics, 101 East Main Street, Little Falls, N.J. 07424) and was incident upon the sample. The light entered through the glass substrate, passed through the ITO coating and polymer film, and reflected off the gold electrode and out making a 90° turn. The reflected light then passed through an analyzing polarizer and on to a germanium photodetector (Model No.: 818-IR, supplied by Newport Corp., P.O. Box 8020, 18235 Mt. Baldy Circle, Fountain Valley, Calif. 92728). A 1000 Hz AC electrical signal of around 50 volts was applied across the sample as a modulating field. This frequency was also supplied to a lock-in amplifier (Model No.: SR530, supplied by Stanford Research Systems, 1290D, Reamwood Avenue, Sunnyvale, Calif. 94089) as a reference signal. The output of the detector was the input signal to the lock-in amplifier and was referenced to the modulating frequency. The value of r was determined by varying the phase of the incident laser light using the Soleil Babinet compensator and measuring the maximum and minimum DC intensities directly from the detector. The compensator was then adjusted until the detector received the average of these two intensities. At this point the modulated signal could be read directly from the lock-in amplifier. The compensator was then tuned through either a maximum or minimum to a point where the average DC intensity level was detected. The modulated signal was again read from the lock-in amplifier and the two readings were averaged. Analysis of the data was done using the procedure of C. C. Teng et al, Applied Physics Letters, referred to above. The value of r at the poling field strength of 100 V/μm was found to be 2.2 pm/V.

Example 12. Measurement of photoconductivity in polymer film of Formula 13

Two films of the polymer of Formula 13 were prepared on two ITO-coated glass substrates (about 1 inch in diameter) following the procedure in Example 9. Measurement of photoconductivity was done by the PID technique using a Monroe Static Charge Analyzer, Model 276A. The film samples were placed on a revolving turntable, spun at about 600 rpm over two corona charging stations 120 degrees apart, and corona charged to about 540 V for about 10 seconds using a positive corona current of about 50 milliamps. This was followed by a 30 second dark decay period and then 30 seconds of PID. An ac electrometer consisting of three electrodes, placed 120 degrees apart, measured and averaged an ac voltage on the samples proportional to the charge on the samples. The change of sample voltage with time, dV/dt, both without and with illumination, was analyzed to measure the dark decay and PID respectively. The initial PID rate of the polymer film of Formula 13, when the carbazole to oxynitrostilbene ratio was 9:1, was found to be 31 V/second, and when the same ratio was 75:25, it was found to be 14 V/second, thus demonstrating the photoconductivity of the polymer.

What is claimed is:

1. A photorefractive composition comprising a polymer the monomeric units of said polymer corresponding to the formula:

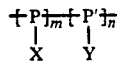

where P and P' could be the same or different and represent monomer moieties, m and n are integers which total at least 10, with the m monomer comprising between about 10-90 mole percent of the total (m+n) monomer units, X comprises a photoconductive moiety selected from the group consisting of carbazole, benzotriazole, arylhydrazone and oxadiazole, and Y comprises a nonliner optical moiety selected from the group consisting of oxynitrostilbene, aminonitrostilbene, aminonitroazobenzene, and amino dicyanovinyltriene, said X and Y moieties being covalently linked to the same polymer chain.

2. The composition as described in claim 1, which additionally comprises a sensitizer.

3. The composition as described in claim 1, where P and P' represent vinyl monomer moieties.

4. The composition as described in claim 1, where P and P' represent siloxane moieties.

5. The composition as described in claim 1, where P and P' represent silane moieties.

6. The composition as described in claim 1, where m represents about 50 mole percent of the total (m+n) monomer units.

7. The composition as described in claim 1, where said photoconductive moiety is a carbazole.

8. The composition as described in claim 2, where said sensitizer is a trinitrofluorenone.

9. The composition as described in claim 2, where said sensitizer is polymeric.

10. A photorefractive medium comprising a polymer, the monomeric units of said polymer corresponding to the formula:

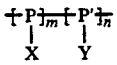

where P and P' could be the same or different and represent monomer moieties, m and n are integers which total at least 10, with the m monomer comprising between about 10-90 mole percent of the total (m+n) monomer units, X comprises a photoconductive moiety selected from the group consisting of carbazole, benzotriazole, arylhydrazone and oxadiazole, and Y comprises a nonliner optical moiety selected from the group consisting of oxynitrostilbene, aminonitrostilbene, aminonitroazobenzene, and amino dicyanovinyltriene, said X and Y moieties being covalently linked to the same polymer chain.

11. A photorefractive device comprising a polymer, the monomeric units of said polymer corresponding to the formula:

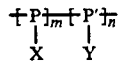

where P and P' could be the same or different and represent monomer moieties, m and n are integers which total at least 10, with the m monomer comprising between about 10-90 mole percent of the total (m+n) monomer units, X comprises a photoconductive moiety selected from the group consisting of carbazole, benzotriazole, arylhydrazone and oxadiazole, and Y comprises a nonliner optical moiety selected from the group consisting of oxynitrostilbene, aminonitrostilbene, aminonitroazobenzene, and amino dicyanovinyltriene, said X and Y moieties being covalently linked to the same polymer chain.

12. A photorefractive composition comprising a polymer, the monomeric units of said polymer corresponding to the formula:

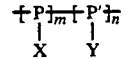

where P and P' represent monomer moieties, with P' being an electrooptic monomer moiety comprising a moiety selected from the group consisting of oxynitrostilbene, aminonitrostilbene, aminonitroazobenzene, and amino dicyanovinyltriene, X is a photoconductive moiety selected from the group consisting of carbazole, benzotriazole, arylhydrazone and oxadiazole, m and n are integers which total at least 10, with the m monomer comprising between about 10-90 mole percent of the total (m+n) monomer units, said X and Y moieties being covalently linked to the same polymer chain.

13. A photorefractive composition comprising a polymer the monomeric units of said polymer corresponding to the formula:

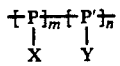

where P and P' represent monomer moieties, with P being a photoconductive monomer moiety comprising a moiety selected from the group consisting of carbazole, benzotriazole, arylhydrazone and oxadiazole, X being an electrooptic moiety consisting of oxynitrostilbene, aminonitrostilbene, aminonitroazobenzene, and amino dicyanovinyltriene, m and n are integers which total at least 10, with the m monomer comprising between about 10–90 mole percent of the total (m+n) monomer units, said X and Y moieties being covalently linked to the same polymer chain.

14. A photorefractive composition comprising a polymer the monomeric units of said polymer corresponding to the formula:

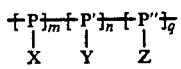

where P, P', and P'' could be the same or different and represent monomer moieties, m, n, and q are integers which total at least 10, with the q monomer comprising up to about 20 mole percent of the total (m+n+q) monomer units, the m monomer comprising up to 50 mole percent of (m+n) monomer units; X comprises a photoconductive moiety selected from the group consisting of carbazole, benzotriazole, arylhydrazone and oxadiazole; Y comprises a nonlinear optical moiety selected from the group consisting of oxynitrostilbene, aminonitrostilbene, aminonitroazobenzene, and amino dicyanovinyltriene; and Z comprises a photosensitizer moiety, said x, y and z moieties being covalently linked to the same polymer chain.

15. The composition as described in claim 11, where said photoconductive moiety is a carbazole.

16. The composition as described in claim 11, where said nonlinear optical moiety is selected from the group consisting of oxynitrostilbene, aminonitrostilbene, aminonitroazobenzene, and amino dicyanovinyl triene.

17. The composition as described in claim 11, where said sensitizer is a trinitrofluorenone.

18. A photorefractive composition comprising a polymer the monomeric units of said polymer represented by the formula:

where m an n are integers which total at least 10, with the m monomer comprising between about 10–90 mole percent of the total (m+n) monomer units, P represents a photoconductive monomer moiety comprising a moiety selected from the group consisting of carbazole, benzotriazole, arylhydrazone and oxadiazole, and P' represents a nonlinear optical monomer moiety comprising a moiety selected from the group consisting of oxynitrostilbene, aminonitrostilbene, aminonitroazobenzene, and amino dicyanovinyltriene, said P and P' moieties being covalently linked parts of the same polymer chain.

19. The composition of claim 18 which additionally comprises a sensitizer.

20. The composition of claim 19 where said sensitizer is covalently linked to said photorefractive polymer.

21. The composition of claim 18 where P is a polymethylphenylsilane.

22. A photorefractive medium comprising a polymer the monomeric units of said polymer represented by the formula:

where m and n are integers which total at least 10, with the m monomer comprising between about 10–90 mole percent of the total (m+n) monomer units, P represents a photoconductive monomer moiety comprising a moiety selected from the group consisting of carbazole, benzotriazole, arylhydrazone and oxadiazole, and P' represents a nonliner optical monomer moiety comprising a moiety selected from the group consisting of oxynitrostilbene, aminonitrostilbene, aminonitroazobenzene, and amino dicyanovinyltriene, said P and P' moieties being covalently linked parts of the same polymer chain.

23. A photorefractive device comprising a polymer, the monomeric units of said polymer represented by the formula:

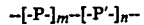

where m and n are integers which total at least 10, with the m monomer comprising between about 10–90 mole percent of the total (m+n) monomer units, P represents a photoconductive monomer moiety comprising a moiety selected from the group consisting of carbazole, benzotriazole, arylhydrazone and oxadiazole, and P' represents a nonliner optical monomer moiety comprising a moiety selected from the group consisting of oxynitrostilbene, aminonitrostilbene, aminonitroazobenzene, and amino dicyanovinyltriene, said P and P' moieties being covalently linked parts of the same polymer chain.

24. A photorefractive composition, comprising a polymer of the formula:

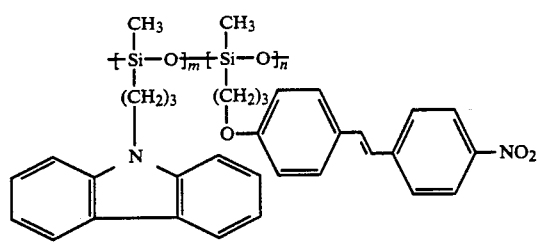

where m and n are integers which total at least 10, with the m monomer comprising between about 10–90 mole percent of the total (m+n) monomer units.

25. A photorefractive composition, comprising a polymer of the formula:

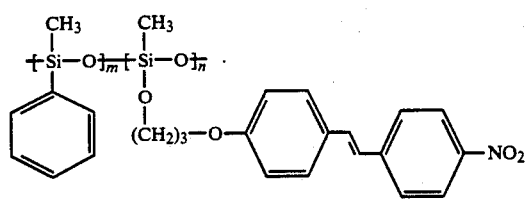

where m and n are integers which total at least 10, with the m monomer comprising between about 10–90 mole percent of the total (m+n) monomer units.

* * * * *